United States Patent [19]
Davis et al.

[11] Patent Number: 5,704,627
[45] Date of Patent: Jan. 6, 1998

[54] CHILD CARRIAGE ATTACHMENT FOR A WHEELCHAIR

[76] Inventors: Edmond Davis; Arthur Saddler, both of c/o Josephine R. Chestnut, 721 Sherman St., Buffalo, N.Y. 14211

[21] Appl. No.: 437,423

[22] Filed: May 12, 1995

[51] Int. Cl.⁶ .................................................. B62J 1/16
[52] U.S. Cl. .................. 280/304.1; 280/202; 280/650; 280/658; 297/195.13; 248/230.4
[58] Field of Search ........................... 280/202, 203, 280/250.1, 304.1, 647, 650, 658, 47.38, 47.39, 47.4, 47.41, 79; 297/184.13, 195.13, 243, 256.1; 403/91, 92, 95, 96; 248/228.4, 229.13, 230.4, 231.51, 316.5

[56] References Cited

U.S. PATENT DOCUMENTS

| | | | |
|---|---|---|---|
| 2,926,880 | 3/1960 | Bourgeois | 248/228.4 X |
| 3,290,050 | 12/1966 | Ezquerra | 297/DIG. 4 |
| 3,309,101 | 3/1967 | Romay | 297/243 |
| 4,183,580 | 1/1980 | Johansson | 297/256.11 |
| 4,711,489 | 12/1987 | Krause | 297/243 |
| 4,779,883 | 10/1988 | Paduano et al. | 280/304.1 |
| 5,074,616 | 12/1991 | Smith | 297/184.13 |
| 5,168,601 | 12/1992 | Liu | 403/202 |
| 5,265,931 | 11/1993 | Ryan | 297/130 |
| 5,401,076 | 3/1995 | Dunlap | 297/243 |
| 5,529,325 | 6/1996 | Glog et al. | 280/202 |

*Primary Examiner*—Victor E. Johnson
*Attorney, Agent, or Firm*—John D. Gugliotta; David L. Volk

[57] ABSTRACT

A cradle is supported by a frame. Two rear supports and two from supports are each rotationally affixed to the frame by a rotational shoulder connection. Each rear support has a telescoping adjustable leg, a spring shock absorber, an adjustable clamp joint, and a vice clamp. Each front support has a vice clamp attached to the rotational shoulder connection. To mount the cradle to the front of a conventional wheelchair, the vice clamps of the rear supports are atttached to a tubular frame of a leg rest normally provided with the wheelchair. The vice clamps of the front supports are then attached to tubular frames of arm rests normally provided with the wheelchair. The cradle may also be attached to the rear of the wheelchair.

8 Claims, 6 Drawing Sheets

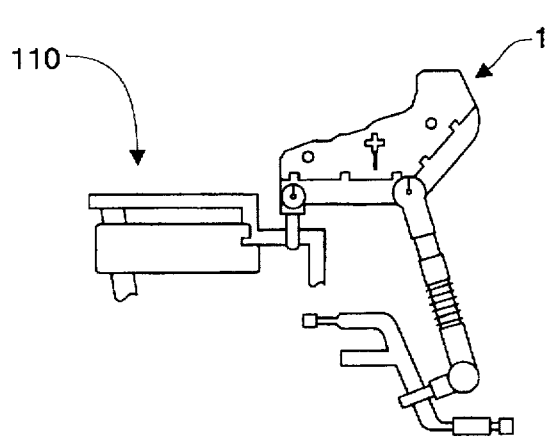
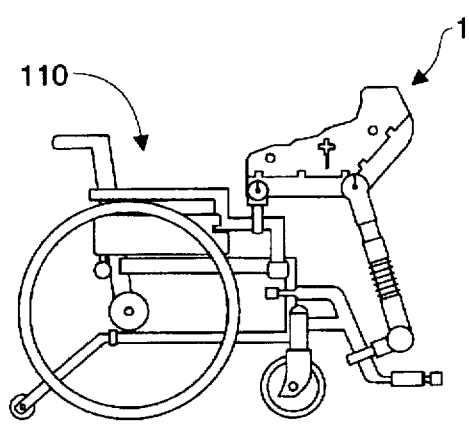
Fig. 5A  Fig. 5B
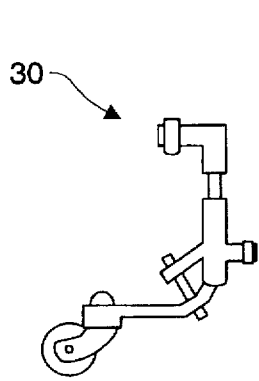
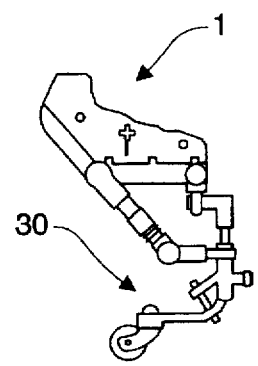
Fig. 6A  Fig. 6B
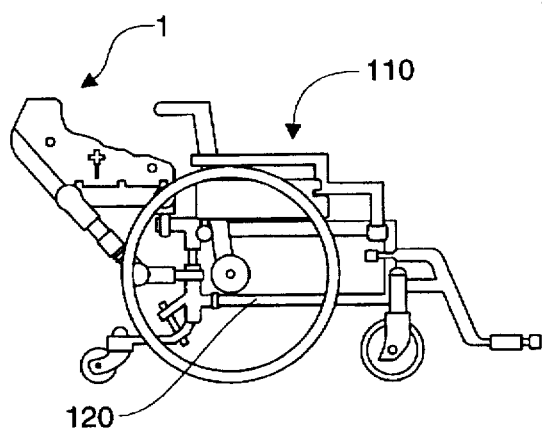
Fig. 6C

CHILD CARRIAGE ATTACHMENT FOR A WHEELCHAIR

BACKGROUND OF THE INVENTION

1. Field of the Invention

The present invention relates generally to child seats, and, more particularly, to a child seat and carriage that can be adjustably mounted on a wheelchair.

2. Description of the Related Art

In the related art, many methods and devices for safely transporting and carrying infants and children are known. Generally, there are many types of high chairs, rockers, carriages, and automobile car seats, just to name a few. One problem that currently occurs in carrying and transporting small children is that a large variety of different specialized equipment are needed, each functioning to be used in only one specific situation.

Another problem occurs in that few, if any, of the above mentioned types of transporting apparatus are readily adaptable for use by physically challenged persons who utilize a wheelchair.

Attempts have been made in the related art to correct for the foregoing problems. For instance, U.S. Pat. No. 5,265,931, issued in the name of Ryan, discloses a detachable child seat and supporting frame. An apparatus made according to the Ryan disclosure utilizes a mountable seat that can be adapted to a variety of specialized frames. However, a child seat made in accordance with this reference is associated with several drawbacks. For example, in order to truly utilize such a device in multiple services, multiple specialized frame devices are required. Moreover, although such a seat can be adapted for use with a wheelchair, such a combination does not, in practice, allow the person who is physically challenged themself to care for or transport a child.

Additionally, U.S. Pat. No. 4,711,489, issued in the name of Krause, discloses a child seat assembly for a wheelchair which comprises two identical supporting frames upon which are slung a fabric seat. By mounting on the frame of a conventional wheelchair, an apparatus made in accordance with the Krause reference is not adaptable to various positions, cannot be utilized with small infants who cannot sit up under their own power, and provides an insufficient safety level for a child.

Consequently, a need has therefore been felt for an improved and more adaptable mechanism that can allow a physically challenged person to care for and transport an infant even though restricted by the use of a wheelchair.

SUMMARY OF THE INVENTION

It is therefore an object of the present invention to provide an improved child carriage for attachment to and use with a conventional wheelchair.

It is a further object of the present invention to provide an improved child carriage for attachment to and use with a conventional wheelchair that can be mounted to the front or to the rear of a conventional wheelchair.

It is a further object of the present invention to provide an improved child carriage for attachment to and use with a conventional wheelchair that can safely accommodate small or newborn infants.

It is a further object of the present invention to provide an improved child carriage for attachment to and use with a conventional wheelchair that is lightweight, thereby not substantially increasing the overall weight of the wheelchair.

It is a feature of the present invention to provide an improved child carriage which can be attached to the front arm-rest of a conventional wheelchair.

It is another feature of the present invention to provide an improved child carriage which can alternatively be attached to the rear of a conventional wheelchair by providing a special apparatus which replaces the anti-tippers (the structure which prevent a wheelchair from tipping over backwards).

It is yet another feature of the present invention to provide an improved child carriage which can used with a conventional wheelchair and provides a shock-absorbing means for the carriage, thereby allowing for a more comfortable ride.

In accordance with the preferred embodiment, an improved child carriage is provided which comprises two rear supports and two front supports each rotationally affixed to a frame by a rotational shoulder connection. Each rear support has a telescoping adjustable leg, a spring shock absorber, an adjustable clamp joint, and a vice clamp. Each front support has a vice clamp attached to the rotational shoulder connection. To mount the carriage to the front of a conventional wheelchair, first the rear telescoping adjustable legs are secured to the desired length. The vice clamps are then attached to the tubular frames of the leg-rests which are provided with a standard wheelchair. The vice clamps for the two front supports are then attached to the tubular frames of the arm rests which are provided with a standard wheelchair. This provides a secure carriage facing in the direction of the wheelchair in order to allow the user to monitor and care for the carriage's occupant.

To mount the carriage to the rear of a conventional wheelchair, a rear mounting frame is provided which incorporates the anti-tip function associated with a conventional wheelchair and which utilizes tubular connection shafts that are positioned such that attachment to them is similar to the manner of attachment to the front of a conventional wheelchair. In this position, the wheelchair occupant has unobstructed forward vision.

An advantage of the present invention is that is can be easily mounted for use with a conventional wheelchair.

Another advantage of the present invention is that small infants or newborns can be carried in a horizontal position within the carriage.

More advantages of the present invention are that it can be mounted to the front or to the rear of a conventional wheelchair.

Yet another advantage of the present invention is that it provides a means to dampen jolts and vibration to the carriage portion.

Finally, another advantage of the present invention is that it is lightweight, thereby not adding significantly to the overall weight of a conventional wheelchair.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIGS. 5A and 5B are side views depicting a child carriage attachment for a wheelchair according to the preferred embodiment of the present invention mounted in the forward position of a wheelchair; and FIGS. 6A, 6B, and 6C are side views depicting a child carriage attachment for a wheelchair according to the preferred embodiment of the present invention mounted in the rearward position of a wheelchair.

DESCRIPTION OF THE PREFERRED EMBODIMENTS

1. Detailed Description of the Figures

Figure 1:
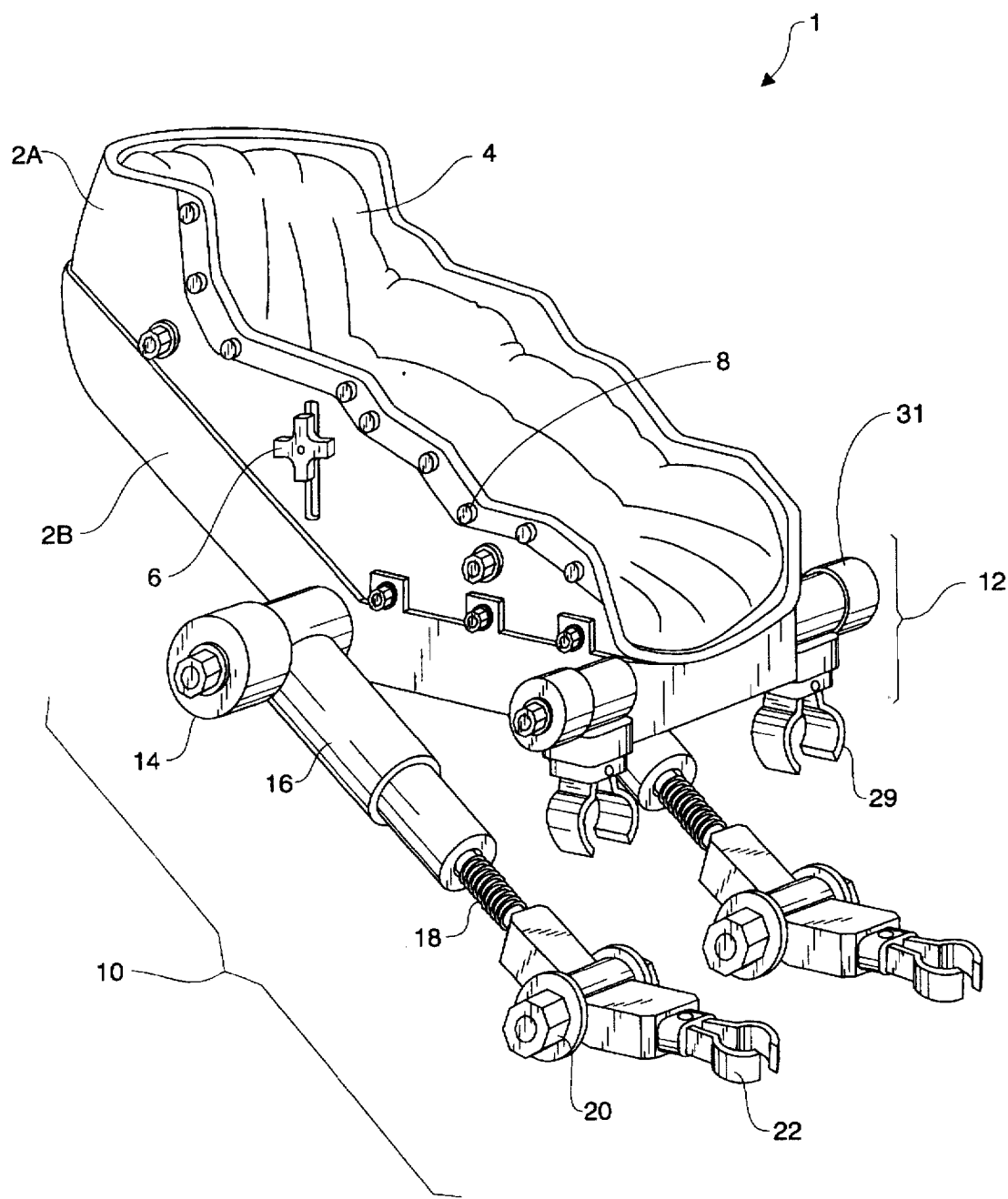
FIG. 1 is a perspective view of a child carriage assembly for attachment to a wheelchair according to the preferred embodiment of the present invention.

Referring now to FIG. 1, a child carriage assembly 1 is shown, according to the present invention, comprising an infant carriage 2A, and a frame 2B supporting a mattress 4. It is presently envisioned that generally available and standard designs for the carriage 1 can be utilized as pad of the present invention, and may include such features as a mattress support adjustment means 6, and/or clip attachments 8 for use with covering devices such as a bug net or sun screen, or the like.

Figure 3A:
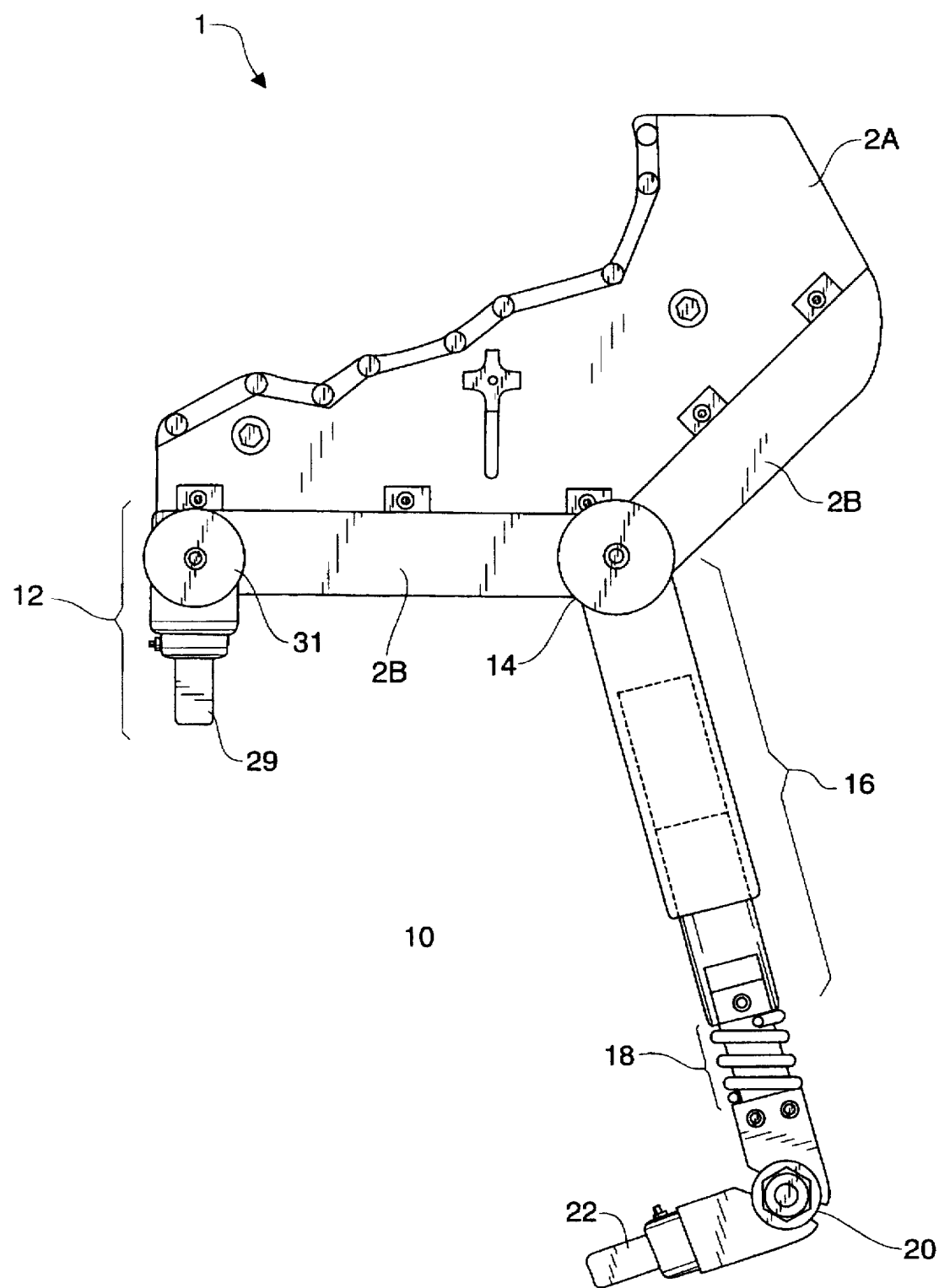
FIG. 3A is a side view of the child carriage attachment for a wheelchair as shown in FIG. 1.

As shown in both FIG. 1 and FIG. 3A, affixed to the frame 2 are a plurality of rear support members 10 and front support members 12. Each rear support member 10 is rotationally attached to the frame 2 at a rear rotational shoulder 14. Extending from the rear rotational shoulder 14 is a telescoping leg 16. Attached to the distal end of the telescoping leg 16 is a first shock absorbing means 18, an adjustable clamp joint 20, and a first vice clamp 22. It is currently envisioned that the telescoping leg 16 can be secured at a desired extended length via a number of conventional locking means, such as push-locks, screw clamps, or even friction. Due to the locking abilities of the rear rotational shoulder 14, the adjustable clamp joints 20, the first vice clamps 22, and the front support member 12, the type and strength of the method of securing the telescoping leg 16 is not considered critical to insuring the overall integrity of the present invention.

Each front support member 10 is comprised of a second vice clamp 29 affixed directly to a front rotational shoulder 31. It is presently envisioned that the front rotational shoulder 31 will be of similar style and function as the rear rotational shoulder 14. It is also presently envisioned that the second vice clamp 29 will be of similar style and function as the first vice clamp 22.

Figure 2:
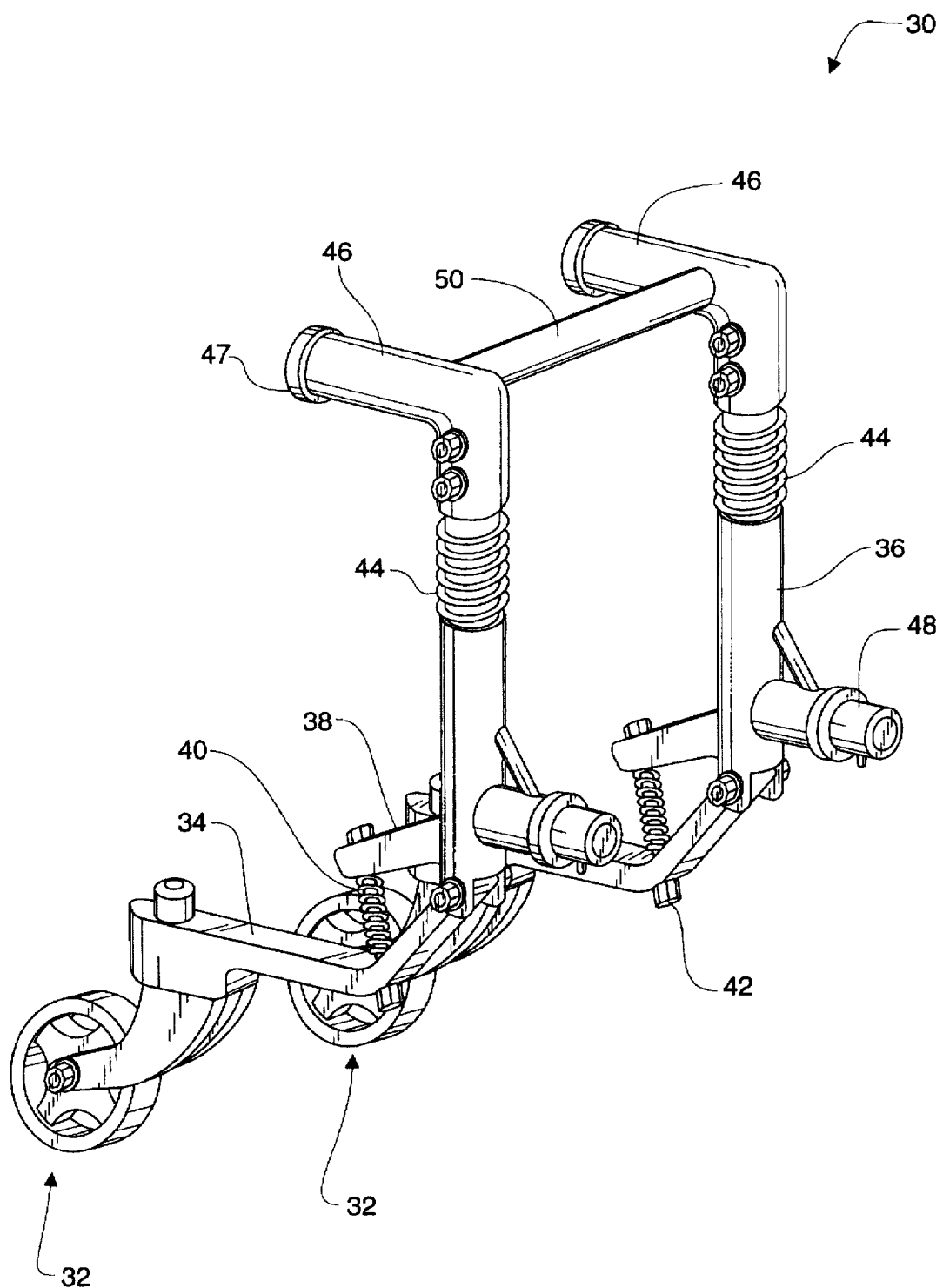
FIG. 2 is a perspective view of a rear frame attachment for use with the child carriage attachment for a wheelchair as shown in FIG. 1.
Figure 3B:
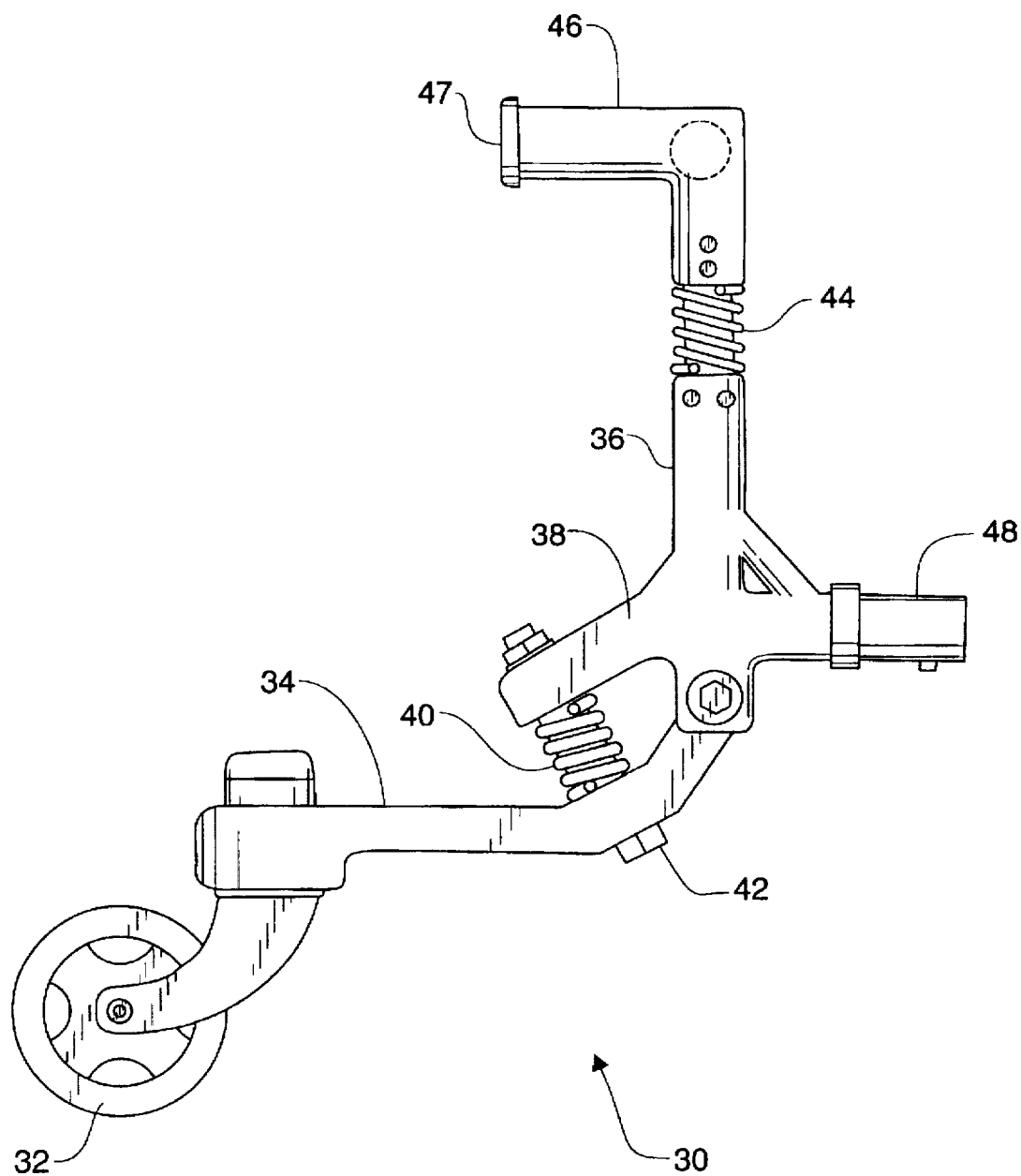
FIG. 3B is a side view of the rear frame attachment as shown in FIG. 2.

Referring to FIG. 2 and FIG. 3B, a rear carriage attachment 30 is shown in greater detail, comprising a pair of swivel wheels 32 each mounted to a wheel blade 34. Each wheel blade 34 is attached pivotally in one plane to a vertical support shaft 36. According to the preferred embodiment, the vertical support shaft 36 contains a protuberance 38 for mounting a second spring means 40 between the protuberance 38 and the wheel blade 34. A spring bolt 42 retains and completes the assembly which functions as the anti-tipping structure of a standard wheelchair.

The upper end of each vertical support shaft 36 contains a second shock absorbing means 44, and a perpendicular, horizontal clamping shaft 46. The clamping shaft 46 is terminated by a retaining flange 47. At the lower end of each vertical support shaft 36, a perpendicular, horizontal connecting shaft 48 extends opposite the perpendicular, horizontal clamping shaft 46. In its preferred embodiment, and as additionally depicted in FIGS. 6A through 6C, it is envisioned that the rear carriage attachment 30 would replace the anti-tipping structures of a standard wheelchair by inserting the connecting shafts 48 into the tube originally designed to retain the anti-tipping structures. The pair of support shafts 36 are connected via a horizontal brace member 50, as shown in FIG. 2. Such a completed assembly would provide a strong, sturdy, and lightweight rear structure to which the child carriage attachment shown in FIG. 1 can then be attached.

Figure 4:
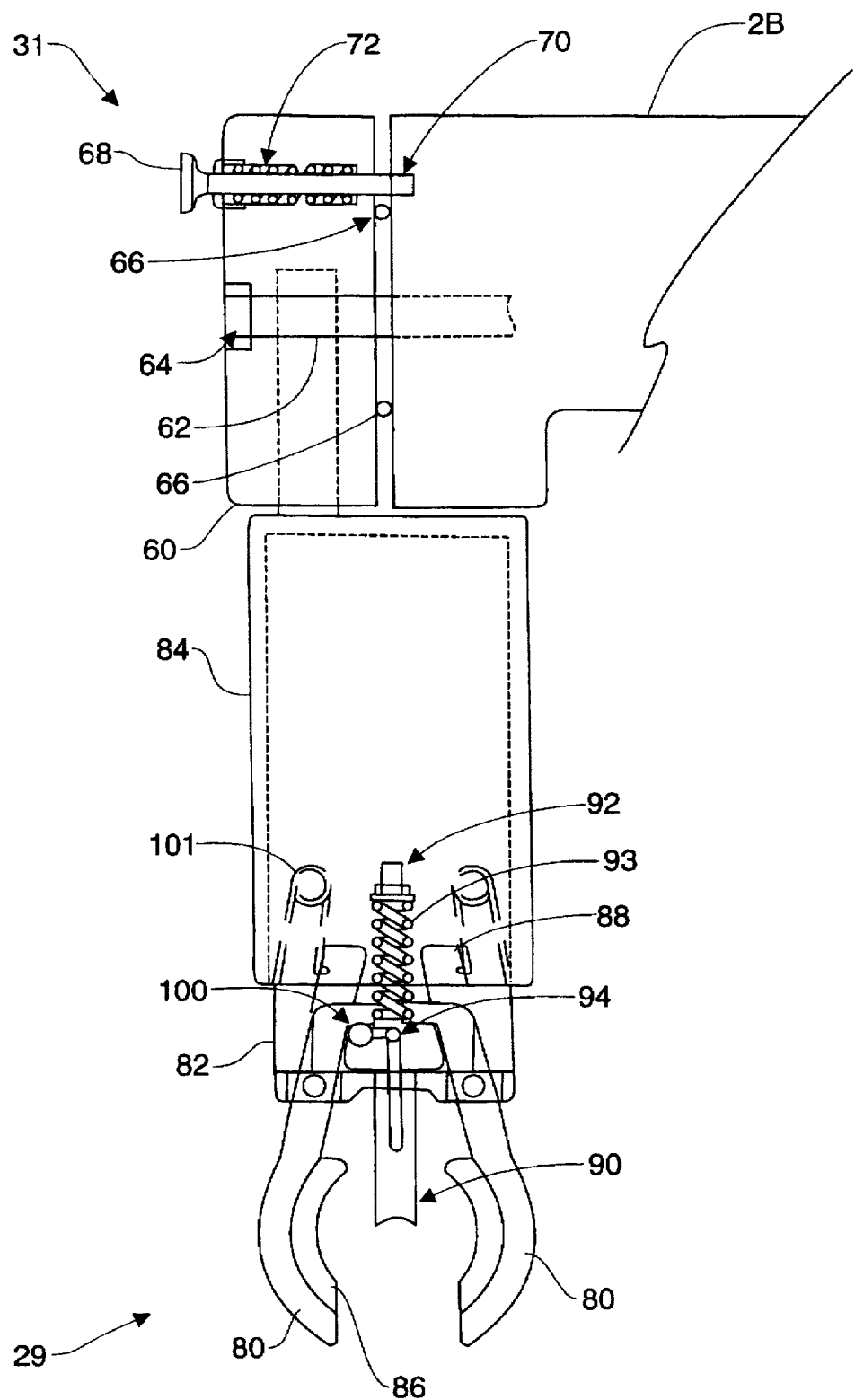
FIG. 4 is a detailed side view of a vice clamp mechanism for use with the preferred embodiment of the present invention.

FIG. 4 shows in greater detail the front rotational shoulder 31 and second vice clamp 29, although it is currently envisioned that a similar design would also accommodate the rear rotational shoulder 14 and first vice clamp 22.

The front rotational shoulder 31 comprises a collar 60 rotatably mounted on an axle 62, and retained by a first retaining nut 64. The axle 62 is attached to a portion of the frame 2B. Detained between the collar 60 and the frame 2B are a plurality of bearings 66. A shoulder lock 68 penetrates the collar 60 and inserts into one of a plurality of receiving holes 70. A plurality of receiving holes 70 are arrayed along the mating surface of the frame 2B in order to provide a variety of locking position and thereby providing adjustability. A fourth spring 72 is provided to insure that the shoulder lock 68 does not become disengaged from a receiving hole 70.

Referring again to FIG. 4, the second vice clamp 29 is also shown in greater detail, comprised of a pair of opposed clamp jaws 80, a sliding sleeve 82, and an collet 84. Each clamp jaw 80 has a cushion 86 lining the clamping surface in order to increase the friction at the connection point, thereby improving the strength of the connection while resisting loosening due to vibration. The clamp jaws 80 also have an elongated arm portion 88, which are pivotally affixed within the sliding sleeve 82. A snap button 90 passes between the opposed clamp jaws 80 and into the sliding sleeve 82. The snap button 90 is linearly aligned and in physical contact with a sliding spring shaft 92. A sliding spring 93 is contained around and by the sliding spring shaft 92 and the snap button 90. A locking shaft 94 is mounted around the sliding spring shaft 92, and is wedged between the elongated arm portions 88 of the clamp jaws 80. In operation, when a user places the clamp jaws 88 around a tubular member such as those comprising the arm-rest or leg-rest portions of a conventional wheelchair, the tubular member comes in contact with the snap button 90. As the user pushes the clamp jaws 80 further onto a tubular member, the snap button 90 is inserted into the sliding sleeve 82, and therefore pushes the locking shaft 94 and sliding spring shaft 92. The locking shaft 94 wedges between the elongated arm portions 88 of the clamp jaws 80 and forces the elongated arm portions outward, thereby forcing the clamp jaws 80 to close around the desired tubular member. Such a vice clamp allows the user to effectively and securely "snap" the device onto a tubular piece of steel such as those used in the manufacture of wheelchairs or bicycles. In order to release the first clamp vice 22, a release button 100 is depressed allowing the sliding spring 93 to force the locking shaft 94 outward, thereby removing the "wedge" which forced the elongated arm portions 88 outward and allowing the clamp jaws 80 to release. A clamp spring 101 returns the clamp jaw 80 to the original position.

2. Operation of the Preferred Embodiment

To use the present invention with the child carriage assembly 1 mounted in a forward position, FIG. 5A and 5B depict how the child carriage assembly 1 is affixed to the forward portion of a wheel chair 110. The front support member 12 is clamped to the tubular member used as part of an armrest 112. The rear support member 10 is then adjusted to the proper length and clamped to the tubular members used as part of the leg/foot rest 114 of the wheelchair 110.

To use the present invention with the child carriage assembly 1 mounted in a rearward position, FIGS. 6A, 6B and 6C depict how the child carriage assembly 1 is affixed to the rear carriage attachment 30 in the manner similar to that described above. The front support member 12 is clamped to the clamping shafts 46. The rear support member 10 is then adjusted to the proper length and clamped to the vertical support shafts 36. The entire carriage attachment 30 can then replace the anti-tip rear wheels that are normally provided with a conventional wheelchair 110. This can be accomplished by inserting the connecting shafts 48 into the tubular frame 120 that originally contained the wheelchair anti-tip rear wheels.

The foregoing description of the preferred embodiment of the present invention has been presented for purposes of illustration and description. It is not intended to be exhaustive or to limit the present invention to the precise form disclosed, and obviously many modifications and variations are possible in light of the above teachings.

The preferred embodiment was chosen and described in order to best explain the principles of the present invention and its practical application to those persons skilled in the art, and thereby to enable those persons skilled in the art to best utilize the present invention in various embodiments and with various modifications as are suited to the particular use contemplated, or to other similar uses such as with bicycles, swings, or the like. It is intended that the scope of the present invention be broadly defined by the claims which follow.

What is claimed is:

1. A child carriage attachment for use with a wheelchair having a tubular steel frame, said child carriage attachment comprising:
   a. a rigid frame;
   b. an infant cradle, said infant cradle supporting a mattress and said cradle supported rigidly and adjustably by said rigid frame;
   c. a plurality of support members adjustably affixed to said rigid frame;
   d. a plurality of clamping means for clamping said support members to the tubular steel frame of said wheelchair;
   e. said plurality of support members comprising at least one front support member, each said front support member rotationally attached to said rigid frame, and at least one rear support member, each said rear support member rotationally attached to said rigid frame;
   f. said front support member comprising a rotational collar having at least an inner surface and an outer surface;
   g. said front support member further comprising an elongated axle supporting said rotational collar having an inner end and an outer end, said inner end affixed to said rigid frame and said outer end passing through and beyond said rotational collar;
   h. said front support member further comprising a retaining nut affixed to said outer end of said axle in a manner to retain said rotational collar upon said axle;
   i. said front support member further comprising a retaining slot formed by the inner surface of said rotational collar and said rigid frame;
   j. said front support member further comprising a plurality of bearings held within said retaining slot, said bearings being in physical contact with both said inner surface of said rotational collar and said rigid frame; and
   k. said front support member further comprising a locking means for locking said rotational collar at one of a plurality of fixed positions, a first lock disengaging means for disengaging said locking means, and a clamp connecting means for attaching said clamping means to said front support member.

2. The child carriage attachment as described in claim 1, wherein said clamp connecting means and said clamping means are formed as one integral structure comprising:
   a. a rigid shaft member connected to said rotational collar;
   b. a plurality of opposed clamp jaws, each clamp jaw having a clamping surface and an elongated arm portion, and being pivotally affixed to said rigid shaft member;
   c. at least one cushion, said cushion lining the clamping surface of said clamp jaws;
   d. a generally cylindrical, hollow, sliding collar surrounding said rigid shaft member and slidable over said elongated arm portions of said clamp jaw for locking said clamp jaws in a closed position; and
   e. second lock disengaging means for unlocking said clamp jaws from said closed position.

3. A child carriage attachment for use with a wheelchair having a tubular steel frame, said child carriage attachment comprising:
   a. a rigid frame;
   b. an infant cradle, said infant cradle supporting a mattress and said cradle supported rigidly and adjustably by said rigid frame;
   c. a plurality of support members adjustably affixed to said rigid frame;
   d. a plurality of clamping means for clamping said support members to the tubular steel frame of said wheelchair;
   e. said plurality of support members comprising at least one front support member, each said front support member rotationally attached to said rigid frame, and at least one rear support member, each said rear support member rotationally attached to said rigid frame;
   f. said rear support member comprising a rotational collar having at least an inner surface and an outer surface;
   g. said rear support member further comprising an elongated axle supporting said rotational collar having an inner end and an outer end, said inner end affixed to said rigid frame and said outer end passing through and beyond said rotational collar;
   h. said rear support member further comprising a retaining nut affixed to said outer end of said axle in a manner to retain said rotational collar upon said axle;
   i. said rear support member further comprising a retaining slot formed by the inner surface of said rotational collar and said rigid frame;
   j. said rear support member further comprising a plurality of bearings held within said retaining slot, said bearings being in physical contact with both said inner surface of said rotational collar and said rigid frame; and
   k. said rear support member further comprising a locking means for locking said rotational collar at one of a plurality of fixed positions, a first lock disengaging means for disengaging said locking means, and a clamp connecting means for attaching said clamping means to said rear support member.

4. The child carriage attachment as described in claim 3, wherein said clamp connecting means and said clamping means are formed as one integral structure comprising:

a. a rigid shaft member connected to said rotational collar;
   b. a plurality of opposed clamp jaws, each clamp jaw having a clamping surface and an elongated arm portion, and being pivotally affixed to said rigid shaft member;
   c. at least one cushion, said cushion lining the clamping surface of said clamp jaws;
   d. a generally cylindrical, hollow, sliding collar surrounding said rigid shaft member and slidable over said elongated arm portions of said clamp jaw for locking said clamp jaws in a closed position; and
   e. second lock disengaging means for unlocking said clamp jaws from said closed position.

5. A child carriage attachment for use with a wheelchair having a tubular steel frame, said child carriage attachment comprising:

a. a rigid frame;
   b. an infant cradle, said infant cradle supporting a mattress and said cradle supported rigidly and adjustably by said rigid frame;
   c. a plurality of support members adjustably affixed to said rigid frame;
   d. a plurality of clamping means for clamping said support members to the tubular steel frame of said wheelchair;
   e. a rear carriage attachment comprising a plurality of connecting shafts, each said connecting shaft mountable to a rear of said wheelchair;
   f. at least one vertical support shaft, said vertical support shaft having an upper end and a lower end and being in connection with said connecting shafts, said vertical support shaft further comprising a first shock absorbing means for dampening vibration between said lower end and said upper end;
   g. at least one clamping shaft, said clamping shaft in connection with said upper end of and generally perpendicular to said vertical support shaft, said clamping shaft providing support for and for attachment to the child carriage attachment;
   h. at least one wheel blade in connection with said lower end of said vertical support shaft;
   i. at least one swivel wheel for contact with the ground rotatably affixed to said wheel blade; and
   j. second shock absorbing affixed means between said lower end of said vertical support shaft and said wheel blade for dampening vibration to the vertical support shaft caused by the contact between said swivel wheel and the ground.

6. A child carriage attachment for use with a wheelchair having a tubular frame, said child carriage attachment comprising:

a. a rigid frame;
   b. an infant cradle, said infant cradle supporting a mattress and said cradle supported rigidly and adjustably by said rigid frame;
   c. at least one rear support member comprised of an elongated, telescoping arm, said telescoping arm having an upper end and a lower end, said upper end being adjustably affixed at said upper end to said rigid frame;
   d. at least one front support member comprised of an elongated fixed arm having an upper end and a lower end, said upper end being adjustably affixed to said rigid frame; and
   e. clamping means affixed to each said lower end of said telescoping arm and to each said lower end of said fixed arm for removably clamping said child carriage attachment to said wheelchair, each said clamping means comprising a pair of spring tensioned opposed clamp jaws, locking engagement means protruding between said opposed clamp jaws for locking said clamp jaws in a closed position, and lock releasing means for unlocking said clamp jaws.

7. The child carriage attachment as described in claim 6, wherein each said front support member further comprises:

a. a rotational collar having at least an inner surface and an outer surface;
   b. an elongated axle supporting said rotational collar having an inner end and an outer end, said inner end affixed to said rigid frame and said outer end passing through and beyond said rotational collar;
   c. a retaining nut affixed to said outer end of said axle in a manner to retain said rotational collar upon said axle;
   d. a retaining slot formed by the inner surface of said rotational collar and said rigid frame; and
   e. a plurality of bearings held within said retaining slot, said bearings being in physical contact with both said inner surface of said rotational collar and said rigid frame.

8. The child carriage attachment as described in claim 6, wherein each said rear support member further comprises:

a. a rotational collar having at least an inner surface and an outer surface;
   b. an elongated axle supporting said rotational collar having an inner end and an outer end, said inner end affixed to said rigid frame and said outer end passing through and beyond said rotational collar;
   c. a retaining nut affixed to said outer end of said axle in a manner to retain said rotational collar upon said axle;
   d. a retaining slot formed by the inner surface of said rotational collar and said rigid frame; and
   e. a plurality of bearings held within said retaining slot, said bearings being in physical contact with both said inner surface of said rotational collar and said rigid frame.

* * * * *